United States Patent
Cullen et al.

[11] Patent Number: 5,303,168
[45] Date of Patent: Apr. 12, 1994

[54] ENGINE OPERATION TO ESTIMATE AND CONTROL EXHAUST CATALYTIC CONVERTER TEMPERATURE

[75] Inventors: Michael J. Cullen, Dearborn; James M. Kindree, Livonia; Richard L. Wanat, Troy, all of Mich.

[73] Assignee: Ford Motor Company, Dearborn, Mich.

[21] Appl. No.: 785,719

[22] Filed: Oct. 31, 1991

[51] Int. Cl.$^5$ .......................... F02P 5/14; G06F 15/48
[52] U.S. Cl. ................. 364/557; 364/431.05; 364/431.07; 123/425; 123/436
[58] Field of Search ................ 364/557, 558, 431.05, 364/431.08, 431.07; 123/425, 436, 527, 478, 543, 430; 60/276, 277, 285

[56] References Cited

U.S. PATENT DOCUMENTS

| | | | |
|---|---|---|---|
| 3,626,909 | 12/1971 | Hayashida et al. | 60/285 |
| 4,201,161 | 5/1980 | Sasayama et al. | 60/276 |
| 4,383,456 | 5/1983 | Ganoung | 74/866 |
| 4,393,837 | 7/1983 | Sugihara et al. | 123/425 |
| 4,541,367 | 9/1985 | Lindberg | 123/25 |
| 4,633,838 | 1/1987 | Fukui | 123/488 |
| 4,656,829 | 4/1987 | Creps et al. | 60/277 |
| 4,915,079 | 4/1990 | Holmes | 123/419 |
| 5,136,517 | 8/1992 | Cullen et al. | 364/431.05 |
| 5,150,690 | 9/1992 | Carter et al. | 123/527 |

Primary Examiner—Thomas G. Black
Assistant Examiner—Jacques H. Louis-Jacques
Attorney, Agent, or Firm—Peter Abolins; Roger L. May

[57] ABSTRACT

A method of operating an internal combustion engine wherein a predicted engine exhaust temperature is used as an input to a microprocessor controlling the engine. Exhaust temperature can be controlled by adjusting engine operation. Exhaust gas recirculation mass flow can be more accurately determined using the predicted engine exhaust temperature.

11 Claims, 4 Drawing Sheets

MAP 397, 1500 - 4000 RPM, MBT SPARK, 0 EGR, 10 - 100% WOT TORQUE
EFFECT OF AIR / FUEL RATIO ON EXHAUST TEMPERATURE,

MAP 397, 14.6 A/F, MBT SPARK, EFFECT OF EGR ON EXHAUST TMP 1990 1.9L CVH, EEC EXHAUST TEMPERATURE MODEL, 12.0 - 18.0 A/F, 0 - 15% EGR
700 - 5000 RPM, 10 - 100% WOT TORQUE, MBT + 15 DEG TO MBT - 40 DEG SPARK ADVANCE

ENGINE OPERATION TO ESTIMATE AND CONTROL EXHAUST CATALYTIC CONVERTER TEMPERATURE

BACKGROUND OF THE INVENTION

1. Field of the Invention

This invention relates to predicting exhaust gas temperatures of an internal combustion engine.

2. Prior Art

Exhaust gas temperatures from internal combustion engines are typically considered when designing engine exhaust systems and components of such systems. Exhaust gas temperature from an engine can be determined by measuring the temperature of the engine exhaust gas. Alternatively, various thermodynamic considerations can be considered and a predicted exhaust gas temperature can be calculated based upon the thermal mass and conductance of the engine and the expected steady-state engine operating parameters.

It would be desirable to have a method of determining exhaust gas temperature as a function of actual engine operating conditions. The method can provide an engine control input for an engine controller which can adjust engine operation to control the engine exhaust gas temperature. Further, the accuracy of determining exhaust gas recirculation mass flow can be improved by using predicted exhaust gas temperature.

U.S. Pat. No. 4,656,829 teaches a method of predicting the temperature of the bed of a catalytic converter positioned in the exhaust system of an internal combustion engine. The catalytic converter temperature is predicted based on engine operating parameters by using empirically determined steady state temperature contributions to the catalytic converter from the mass air flow through the engine and the air/fuel ratio of the mixture supplied to the engine. These steady state values are applied to a first order lag filter equation having a time constant that is based on mass air flow through the engine and which defines the response of the catalytic converter temperature to transient operation of the engine. There is no specific compensation for engine speed, ignition timing and exhaust gas recirculation rate. Accordingly, a more accurate means for inferring and controlling engine exhaust gas temperature would be desirable.

SUMMARY OF THE INVENTION

This invention includes a method for predicting engine exhaust gas temperature during engine operation. Information from various sensors is processed by a microprocessor which dynamically predicts exhaust temperature with varying engine speed, load, spark advance, exhaust gas recirculation percent and air/fuel ratio. Knowledge of exhaust temperature is useful as a feedback variable for catalyst over temperature protection, exhaust valve over temperature protection and providing catalyst light off. That is, the catalyst and the exhaust valve must be protected from temperatures which exceed their operating ability. Also, the catalyst must reach a certain "light off" temperature before it operates effectively.

A prediction model in accordance with an embodiment of this invention includes a speed/load table of exhaust temperatures, measured at the exhaust manifold, at a stoichiometric air/fuel ratio, MBT spark advance and zero exhaust gas recirculation. The effects of varying air/fuel ratio, spark retard and exhaust gas recirculation percent are accounted for through various calibrated multipliers.

BRIEF DESCRIPTION OF THE DRAWINGS

FIG. 1A is a graphical representation of engine rpm versus exhaust gas temperature in an engine exhaust manifold for various engine loads in accordance with an embodiment of this invention;

FIG. 1B is a graphical representation of degrees of engine spark retard relative to MBT versus engine exhaust gas temperature multiplier in accordance with an embodiment of this invention;

FIG. 1C is a graphical representation of air/fuel ratio versus exhaust temperature multiplier in accordance with an embodiment of this invention;

FIG. 1D is a graphical representation of percent of exhaust gas recirculation (EGR) versus engine exhaust gas temperature multiplier in accordance with an embodiment of this invention;

FIG. 2 is a graphical representation of actual engine exhaust gas temperature versus predicted engine exhaust gas temperature in accordance with an embodiment of this invention;

FIG. 3A is a block diagram of an engine and electronic control module in accordance with an embodiment of this invention;

FIG. 3B is a logic flow diagram of the operation of the electronic control module for inferring engine exhaust gas temperature in accordance with an embodiment of this invention; and FIG. 4 is a graphical representation of exhaust gas recirculation (EGR) flow rate in pounds per minute versus delta pressure in units of $H_2O$ across the EGR metering orifice.

DETAILED DESCRIPTION OF THE INVENTION

In accordance with an embodiment of this invention, a steady-state exhaust gas temperature at an engine exhaust gas manifold is determined. This temperature is assumed to be a product of combustion in the engine, so that steady-state temperature equals the transient temperature values. The variable is termed EGT MAN and the units are degrees Fahrenheit. If it is desired to use a ratio scale, degrees Rankin can be used instead. The exhaust temperature can be written as a function as follows:

EGT_MAN=BASE_EXGT(N,AIRCHARGE)-
*AFMUL(A/F)*SPKMUL(SPK_DELTA)-
*EGRMUL (EGRACT)

wherein:
EGT_MAN is exhaust gas temperature at manifold
BASE_EXGT(N,AIRCHARGE) is base exhaust temperature table stoichiometric a/f, 0% EGR, mbt spark
AFMUL(A/F) is exhaust temperature multiplier versus air/fuel ratio
SPKMUL(SPK_DELTA) is exhaust temperature multiplier versus degrees spark retard from MBT
EGRMUL(EGRACT) is exhaust temperature multiplier versus percent EGR
AIRCHARGE is (lbs air/cylinder fill)
N is engine rpm
SAFTOT is final spark advance
EGRACT is actual egr %
A/F is air/fuel ratio The following model predicts the exhaust temperature at the catalyst inlet of an engine controlled by an electronic engine controller:

EGT_CAT=UROLAV(EGT_MAN, TCEGT)−CAT_OFFSET wherein EGT_CAT is exhaust gas temperature at catalyst inlet UROLAV is a temperature rolling average routine processed by the electronic engine controller, TCEGT is the user specified time constant which relates catalyst inlet temperature to the gas temperature EGT_MAN, and CAT. OFFSET is catalyst temperature offset.

The prediction model includes a speed-load table of exhaust temperatures (measured at the exhaust manifold) at stoichiometric air/fuel ratio, MBT spark advance and 0% exhaust gas recirculation (EGR). The effects of varying air/fuel ratio, spark retard and EGR percentage are accounted for through function multipliers. Exhaust temperatures at other locations such as the catalyst can be related to the manifold temperature by a time constant and offset. The strategy process is shown below:

SPKMBT=ROOT_MBT_SPK(N,AIRCHARGE)+MBTEGR(AIRCHARGE)*EGRACT+MBTAFR(A/F)

SPK_DELTA=SPKMBT−SAFTOT

EGT_MAN=BASE EXGT(N,AIRCHARGE)*AFMUL(A/F) *SPKMUL(SPK_DELTA)*EGRMUL(EGRACT)

EGT_CAT=UROLAV(EGT_MAN,TCEGT)−CAT_OFFSET wherein

ROOT_MBT_SPK(N,AIRCHARGE) is mbt spark table at 14.6 a/f, 0% egr

MBTAFR(A/F) is mbt spark adder versus air/fuel ratio

MBTEGR(AIRCHARGE) is spark adder per percent EGR (already used for torque calculation)

Typical calibration values (with exception of the catalyst temperature time constant and offset) and supporting data are shown in FIGS. 1A–1D. The calibration values were derived from engine mapping data.

Figure 1A:
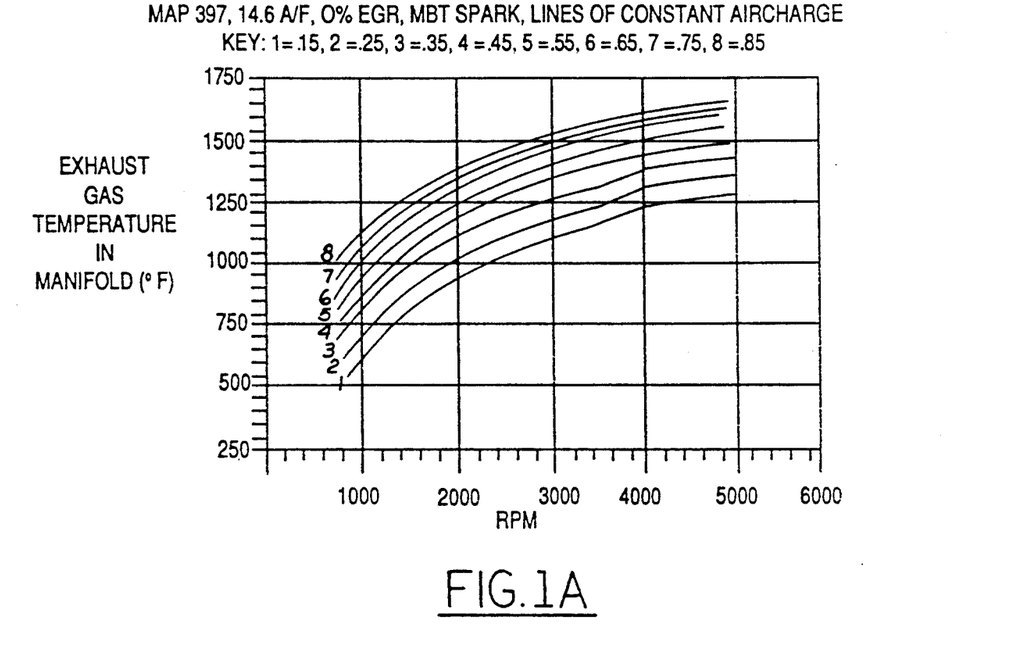
Figure 1B:
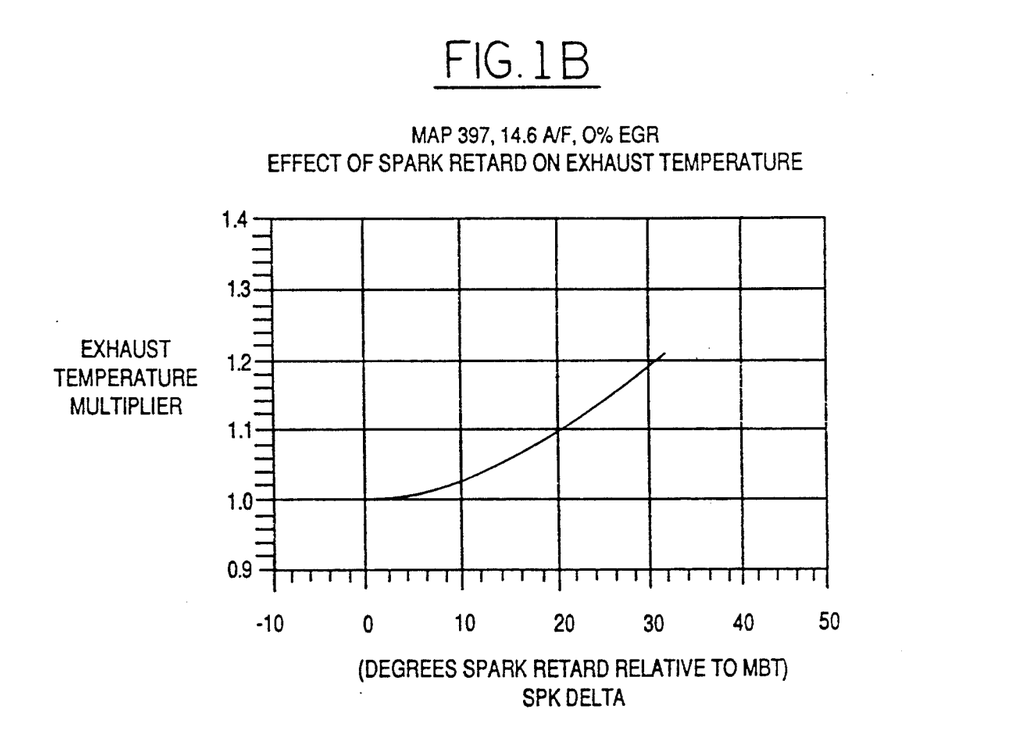
Figure 1C:
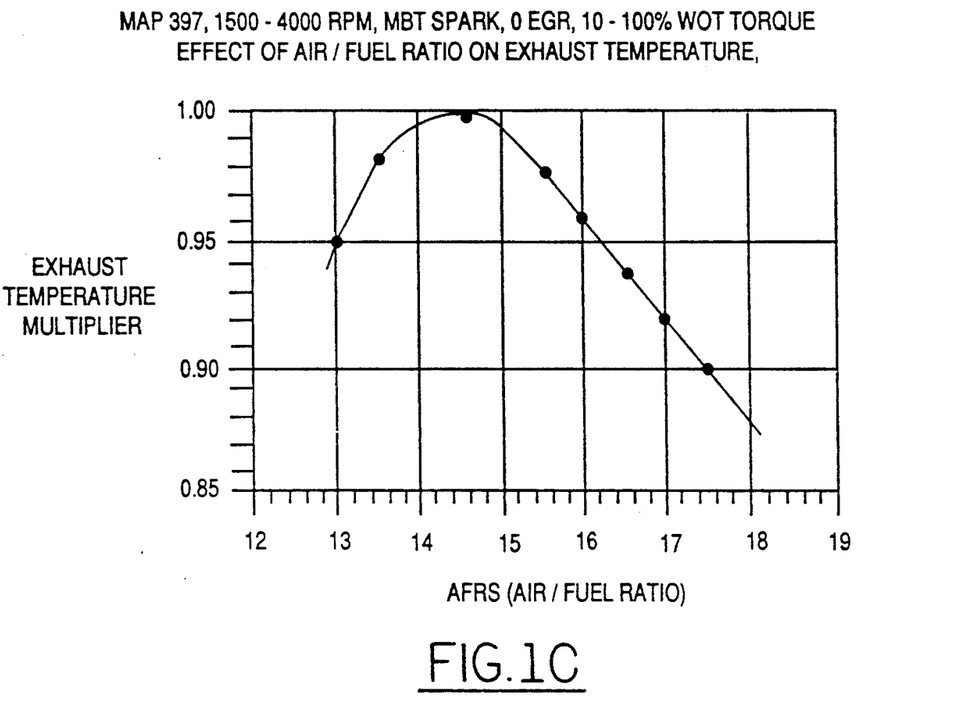
Figure 1D:
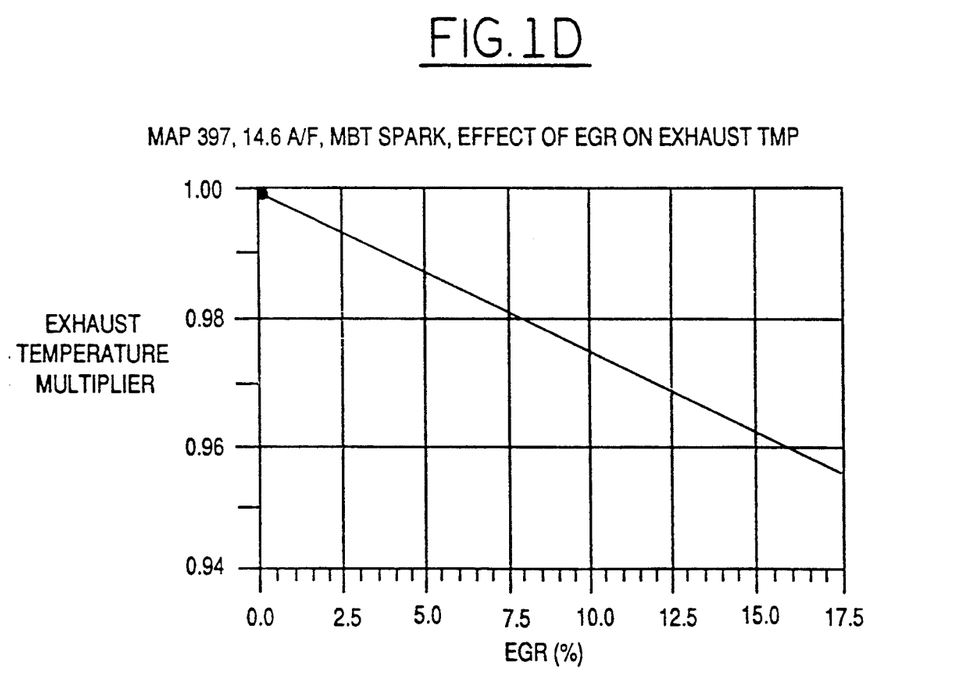
Figure 2:
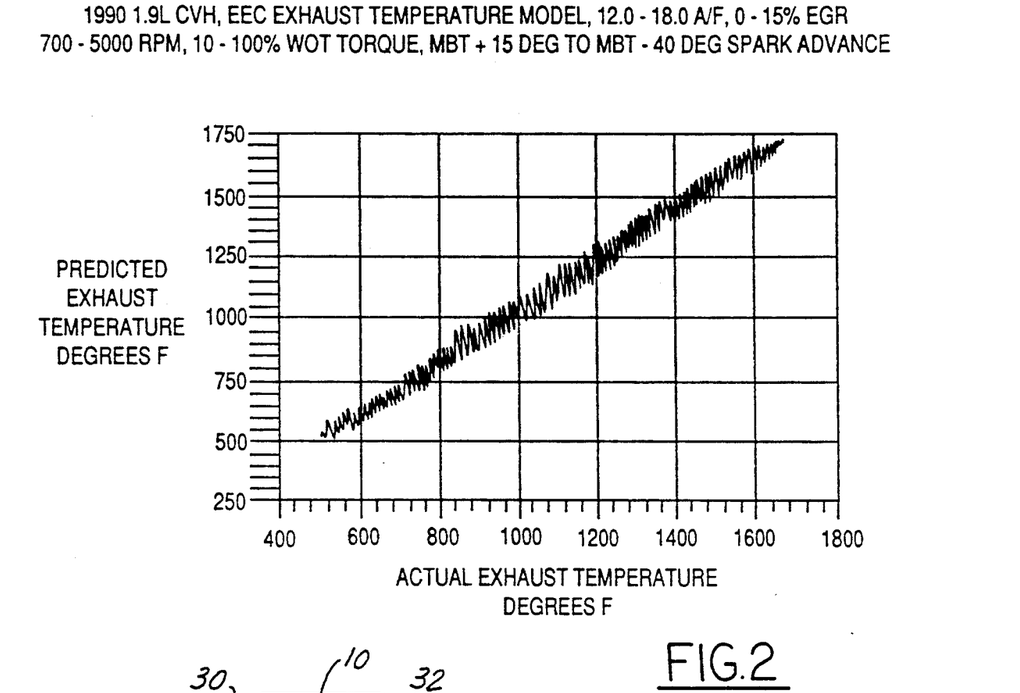

A steady-state computer simulation of the strategy was used to compare the predicted exhaust temperature to the actual temperature recorded on an engine dynamometer for a variety of speed, load, spark advance, EGR percentage and air/fuel ratio combinations. As shown in FIG. 2, there is good correlation ($R_2=0.99$) between the model and actual data.

There are several reasons why exhaust gas temperature should be controlled to a maximum value, including:

(1) Exhaust valve temperatures. Material specifications typically recommend that maximum values range from 1600° to 1700° F. Exceeding these temperatures can cause the exhaust valve to "tulip". Current engine mapping practice is to limit all engine operation to temperatures not exceeding about 1600° F.

(2) Catalyst inlet temperature. The required maximum inlet temperature is advantageously a ROM input to the real time exhaust temperature control strategy.

The catalyst inlet temperature is related to the exhaust gas temperature by the following variables:

(a) The in-cylinder air fuel ratio: There can be an increase in exhaust gas temperature if there is excess fuel (unburned hydrocarbons) and excess oxygen in the exhaust. This can occur at a nominal stoichiometric cylinder mixture when there is maldistribution (some lean cylinders providing the oxygen, the rich or stoic cylinders providing the hydrocarbons). Or it can occur at rich mixtures when an air pump is used to supply excess oxygen. When a nominal rich mixture is used, and the leanest cylinder burns all of its excess oxygen, then the exhaust temperature will not increase over the EGT MAN value.

(b) The length of exhaust pipe between the exhaust flange and catalyst inlet. Heat transfer out of the pipe is proportional to this length.

(c) Cross-sectional area and thickness of exhaust pipe. This affects the heat capacity of the exhaust pipe.

(d) Exhaust mass (or volume) flow. This flow "delivers" the exhaust temperature to the catalyst. The more flow the less temperature drop along the path of the flow.

(e) Ambient temperature. This temperature facilitates the heat transfer out of the exhaust pipe.

(f) Airflow past the exhaust pipe. This flow facilitates the heat transfer out of the exhaust pipe. This airflow is a function of vehicle speed and possibly the cooling fan on/off status.

(g) Exhaust system material and shielding.

An advantageous open-loop air/fuel engine control strategy includes the steps of, first, calculating current steady-state real-time exhaust temperature value EGT_MAN, second, calculating current catalyst inlet temperature using EGT_CAT_INLET=F(TBD STRATEGY, time_constants, EGT_MAN), and third, comparing the EGT_MAN and EGT_CAT_IN to maximum allowable values. If either maximum is exceeded, and the air/fuel ratio is not at the rich limit, then ramp air/fuel ratio is ramped up from increased richness.

A control strategy using the inferred exhaust gas temperatures can be used to control air/fuel ratio as part of the processing of electronic control module II.

This control strategy can be shown in logic notation as follows:

```
EGT_MAN .GT. MAX_EGT_MAN --------!
                                  !-OR-!
EGT_CAT_IN .GT. MAX_EGT_CAT_IN ----!     !
                                         !-AND-[DECREMENT_LAMBSE]
LAMBSE .GT. MIN_LAMBSE_FOR_RELIABILITY ---!
                                         ! -------ELSE-------
                                         !
EGT_MAN .LT. MAX_EGT_MAN ------!
                               !--AND-!
EGT_CAT_IN .LT. MAX_EGT_CAT_IN---!    !
                                      !-AND-[INCREMENT_LAMBSE]
LAMBSE .LT. MIN_LAMBSE_FOR_POWER ------!
``` wherein LAMBSE is defined as the normalized air/fuel ratio, GT indicates greater than, LT indicates less than, and the logic flow is read from top to bottom.

The strategy can also determine the open-loop/closed-loop fuel control decision and provide the MIN_LAMBSE_FOR_POWER value. This value is the air/fuel ratio enrichment desired for maximum torque at high driver demand conditions. The INCREMENT_LAMBSE and DECREMENT_LAMBSE code elements may be as simple as a scalar or have proportional controller.

Another use of a real-time exhaust temperature control strategy would be for a fixed LAMBSE, or for LAMBSE at the MIN_LAMBSE_FOR_RELIABILITY limit, to output a minimum acceptable spark timing value. This is an input of interest to torque modulation strategies. This value can be found by manipulating the real-time exhaust temperature prediction tables. The tables termed SPKMUL(SPK_DELTA) are inverted and used as SPK DELTA(SPKMUL). For any SPKMUL number in the range of approx. 1.0 to 1.2, this function would output the amount of spark retard from MBT allowable so as not to increase the exhaust temperatures over the value at MBT by more than the SPKMUL factor.

For a fixed LAMBSE, say stoichiometric, and a desired peak steady-state temperature termed DESIRED_PEAK EGT, the code would be:

constant versus spark delay in table 25. The indication of the air/fuel ratio at input 12 is applied to tables 17 and 18. Exhaust gas recirculation rate indication from input 13 is applied to table 19.

Aircharge indication from input 15 is applied to tables 20, 21, and 22. An indication of engine speed from input 16 is applied to tables 21 and 22. An indication of exhaust gas recirculation rate from input 13 and an output of table 20 are applied to a multiplier 26. An output of multiplier 26 is applied as a positive input to a summer 23. An output of table 21 is applied as a positive input to summer 23. An output of table 18 is applied as a positive input to summer 23. A summer 24 has a positive input from the output of summer 23 and a negative input from an input indicating spark timing. An output of summer 24 is applied as an input to table 25. An output of table 25 is applied to a multiplier 27 which also receives an input from the output of table 19 and the output of table 22. A multiplier 28 receives an input from an output of multiplier 27 and an output of table 17. An output of multiplier 28 indicates exhaust gas temperature.

Figure 3A:
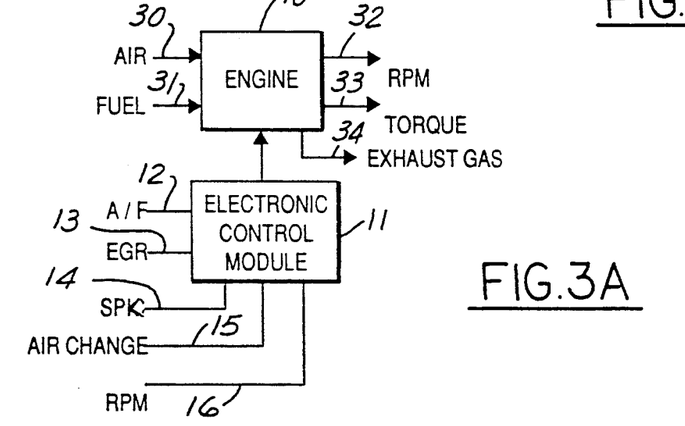
Figure 3B:
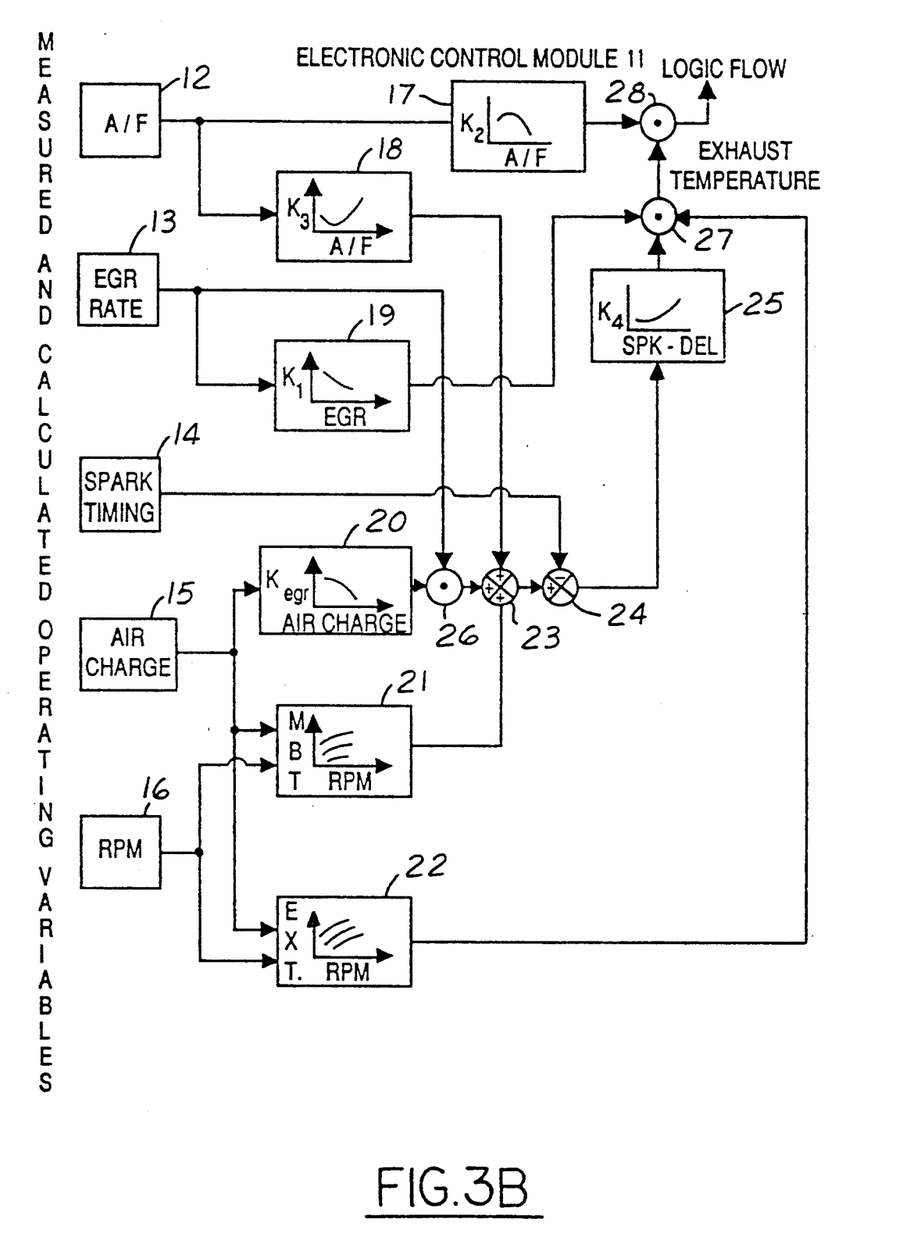

This invention includes also, as various embodiments, subsets of the inputs shown in FIG. 3B. That is, it is not necessary to have all the inputs to provide an indication of exhaust gas temperature. However, rpm and aircharge are always used. Spark timing is used in conjunction with engine exhaust gas recirculation. In particular, advantageous combinations include: (1) engine speed

```
mbt_egt_man = BASE_EXGT(N,AIRCHARGE)*AFMUL(A/F)*EGRMUL(EGRACT)
egt_ratio = desired_peak_egt / mbt_egt_man
egt_ratio > 1.0 -------! max_spk_delta = SPK_DELTA(SPKMUL)
                      ! MIN_ALLOW_SAFTOT = SPK_MBT-max-spk-delta
                      !
                      ! ----------ELSE----------
                      ! MIN_ALLOW_SAFTOT = tbd_other-min-saftot
```

Referring to FIG. 3A, an engine 10 has inputs for providing air charge 30 and fuel 31 and outputs of engine rpm 32, engine torque 33, and engine exhaust gas 34. Engine 10 is coupled to an electronic control module 11 which is provided with an input 12 indicating air/fuel ratio, an input 13 indicating exhaust gas recirculation rate, an input 14 indicating spark timing, an input 15 indicating engine air charge, and an input 16 indicating engine rpm.

Referring to FIG. 3B, an electronic control module logic flow includes inputs indicating air/fuel ratio 12, exhaust gas recirculation rate 13, spark timing 14, aircharge 15, and rpm 16. Stored look-up tables indicating various engine parameters include a constant K versus air/fuel ratio in table 17, a constant $K_3$ versus air/fuel ratio in table 18, a constant $K_1$ versus exhaust gas recirculation rate in table 19, an exhaust gas recirculation constant versus aircharge in table 20, an MBT spark versus engine speed in table 21, an EXT nominal exhaust temperature versus engine speed in table 22, and a and aircharge; (2) engine speed, aircharge, and air/fuel ratio; (3) engine speed, aircharge, air/fuel ratio, exhaust gas recirculation, and spark; and (4) engine speed, aircharge, engine exhaust gas recirculation, and spark.

Figure 4:
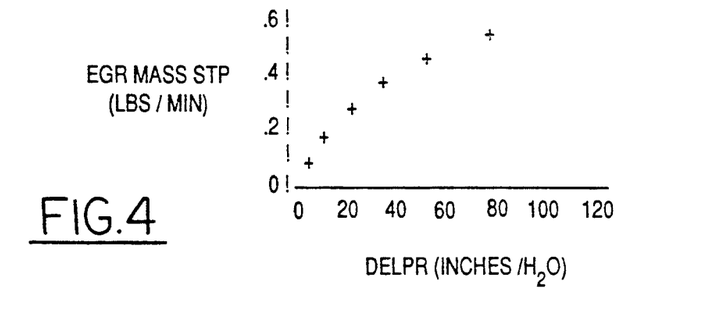

There is a need in internal combustion engine control to know the exhaust gas recirculation (EGR) flow rate in lbs/minute. This value can be derived from a lookup function versus delta pressure (denoted as DELPR with units inches of H2O in FIG. 4), across the EGR metering orifice. Implicit in this lookup table is a reference exhaust gas pressure and exhaust gas temperature since delta pressure is not sufficient to describe EGR mass flow. The final EGR mass flow rate, (denoted as EM with units lbs/minute), has been adjusted for exhaust pressure since the inception of the PFE type systems by the following formula:

$$EM = EGR\_MASS\_STP*SQRT(BP/29.92),$$

where 29.92 is the reference barometric pressure

Using an estimate of exhaust gas temperature at the exhaust manifold, EGT-MAN, the exhaust gas temperature at the EGR metering orifice is modeled as a rolling average of this value.

EGT−EGRORIF=ALPHA*EGT−MAN+(−1−ALPHA)*EGT−EGRORIF−LAST wherein ALPHA is a calibratable, exponential smoothing factor in the range of 0.01 to 0.2. Alternately, another rolling average subroutine could be called as follows:

EGT−EGRORIF=UROLAV (EGT−MAN, TCEGT−EGRORIF)

where TCEGT−EGRORIF is a time constant in seconds. The expected range is 1 to 4 seconds. Given the estimated EGT-EGRORIF value, the following formula is used to calculate EM (LBS/MIN):

EM=EGR−MASS−STP *
(SQRT[(BP±PEXH)/29.92]*
SQRT[1460./(EGT−EGRORIF±460.) ]

wherein:
EGR-MASS-STP—exhaust gas recirculation mass flow at a predetermined or standard temperature and pressure
BP—barometric pressure
PEXH—exhaust gas pressure
SQRT—square root function
EGT—exhaust gas temperature
EGRORIF—exhaust gas temperature at the metering orifice of the exhaust gas recirculation valve
29.92—barometric pressure
1460 DEG.Rankin—temperature of the exhaust gas at the metering orifice
1000 DEG.Fahrenheit—temperature of exhaust gas at the metering orifice Various modifications and variations may occur to those skilled in the art to which this invention pertains. For example, the particular configuration of the electronic engine controller may be varied from that disclosed herein. These and all other such variations come within the scope of the appended claims.

What is claimed:

1. A method of operating an internal combustion engine wherein the method of operating the engine includes using a predicted exhaust gas temperature in conjunction with fuel scheduling for the engine and ignition timing for the engine and choosing a spark value so as to adjust an actual exhaust gas temperature and maintain the actual exhaust gas temperature within limits.

2. A method of operating an internal combustion engine as recited in claim 1 further comprising choosing an air/fuel ratio so as to adjust the exhaust gas temperature and maintain the exhaust gas temperature within limits.

3. A method of inferring engine exhaust gas temperature including:
providing inputs indicating air/fuel ratio, exhaust gas recirculation rate, spark timing, air charge intake, engine speed rpm;
providing stored look-up tables indicating air/fuel ratio versus a first constant, air/fuel ratio versus a second constant, exhaust gas recirculation (EGR) versus a third constant, engine aircharge versus a fourth constant, engine rpm and engine aircharge versus MBT, engine rpm and engine discharge versus nominal exhaust temperature;
multiplying an output from the EGR rate sensor and an output of the engine aircharge versus the fourth constant table to produce a first product;
adding the output from the table of air/fuel ratio versus the second constant, the product, and an output of the rpm versus MBT table to produce a first sum;
finding a difference between the spark timing input and the first sum;
applying the difference to a table for spark delay versus constant;
multiplying an output of the spark delay table by the output of the EGR versus constant table and the rpm versus nominal exhaust temperature table to produce a second product;
multiplying the second product by an output of the air/fuel ratio versus constant to produce a third product of the exhaust temperature;
providing stored tables and memory for adjusting exhaust temperature as a function of air/fuel ratio, exhaust gas recirculation, spark delay and engine speed;
coupling an input indicating air/fuel ratio to information stored as a function of air/fuel ratio;
coupling an input indicating EGR rate to information stored as a function of EGR;
coupling an input indicating air charge to information stored as a function of air charge and engine speed;
coupling engine speed to information stored as a function of engine speed;
multiplying the output of information stored as a function of air charge and an input indicating exhaust gas recirculation and applying the output to a first adder;
applying the output of information stored as a function of air/fuel ratio and information stored as a function of engine speed to the first adder;
applying an input indicating spark timing to the negative input of a difference module and applying output of the first adder to the positive input of the difference module;
applying the output of the difference module to an exhaust temperature adjustment table stored as a function of spark retard;
applying the output of the exhaust temperature adjustment table to a second multiplier along with information stored as a function of exhaust gas recirculation, engine speed stored as a function of spark retard to provide an output indicative of exhaust temperature.

4. A method of inferring engine exhaust gas temperature including:
providing inputs indicating engine speed and engine aircharge;
providing look-up tables stored in memory including a first look-up table indicating an exhaust gas recirculation constant versus aircharge, a second look-up table indicating MBT spark versus engine speed, a third look-up table indicating nominal exhaust temperature (EXT) versus engine speed, and a fourth look-up table indicating a constant versus spark delay;
applying an input indicating aircharge to said first, second, and third tables;

applying an input indicating engine speed to said second and third tables;

applying outputs from said first and second tables to a first summer;

applying an output of said first summer as an input to said fourth table;

applying an output of said fourth table to a first multiplier;

applying an output of said third table to said first multiplier; and using an output of said first multiplier as an indication of exhaust gas temperature.

5. A method of inferring engine exhaust gas temperature as recited in claim 4 further including:

providing an input indicating engine air/fuel ratio;

providing a stored look-up table including a fifth look-up table indicating a constant versus air/fuel ratio and a sixth look-up table indicating a third constant versus air/fuel ratio;

applying an input indicating air/fuel ratio to each of said fifth and sixth tables;

applying an output of said fifth table to a third multiplier;

applying an output of said first multiplier to said third multiplier;

applying an output of table six to said first summer as the positive input; and using an output of said third multiplier as indication of exhaust gas temperature.

6. A method of inferring engine exhaust gas temperature as recited in claim 5 further including:

providing inputs indicating engine exhaust gas recirculation rate and spark timing;

applying an input indicating spark timing as a negative input to a second summer;

applying the output of said first summer as a positive input to said second summer;

applying the output of said second summer as an input to said fourth table;

providing a seventh stored look-up table indicating a first constant coefficient versus exhaust gas circulation rate;

applying an input indicating exhaust gas recirculation rate as an input to said seventh table;

applying the output of said seventh table as an input to said first multiplier;

applying an input indicating exhaust gas recirculation rate as an input to a second multiplier;

applying the output of said first table as an input to said second multiplier; and applying the output of said second multiplier as a positive input to said first summer.

7. A method of of inferring engine exhaust gas temperature as recited in claim 4 further including:

providing inputs indicating engine exhaust gas recirculation rate and spark timing;

providing a seventh look-up table indicating a first constant versus engine exhaust gas recirculation rate;

applying an input indicating spark timing to a second summer as a negative input;

applying the output of said first summer as a positive input to said second summer;

applying an input indicating exhaust gas recirculation rate of an input to a second multiplier;

applying the output of said first table as an input to said second multiplier;

applying the output of said second multiplier as a positive input to said first summer;

applying an input indicating exhaust gas recirculation rate as an input to said seventh table;

applying the output of said seventh table as an input to said first multiplier; and applying the output of said first multiplier as an indication of exhaust gas temperature.

8. A method of operating an internal combustion engine wherein the method of operating the engine includes using a predicted exhaust gas temperature in conjunction with determining an exhaust gas recirculation mass flow rate.

9. A method of operating an internal combustion engine using predicted exhaust gas temperature as recited in claim 8 wherein the exhaust gas recirculation mass flow rate (EM) is determined using:

$$EM = EGR-MASS-STP*SQRT[BP- \pm PEXH)3129.92]*SQRT [1460/(EGT-EGRORIF \pm 460)]$$

wherein 29.92 is the reference barometric pressure, 1460 degrees Rankin is the reference temperature of the exhaust gas at the metering orifice, and wherein:

EGR-MASS-STP—exhaust gas recirculation mass flow at a predetermined or standard temperature and pressure BP—barometric pressure PEXH—exhaust gas pressure SQRT—square root function EGT—exhaust gas temperature EGRORIF—exhaust gas temperature at the metering orifice of the exhaust gas recirculation valve.

10. A method of operating an internal combustion engine using predicted exhaust gas temperature as recited in claim 9 wherein the exhaust temperature is predicted using:

providing inputs indicating air/fuel ratio, exhaust gas recirculation rate, spark timing, air charge intake, engine speed rpm;

providing stored look-up tables indicating air/fuel ratio versus a first constant, air/fuel ratio versus a second constant, exhaust gas recirculation (EGR) versus a third constant, engine aircharge versus a fourth constant, engine rpm and engine aircharge versus MBT, engine rpm and engine discharge versus nominal exhaust temperature;

multiplying an output from the EGR rate sensor and an output of the engine aircharge versus the fourth constant table to produce a first product;

adding the output from the table of air/fuel ratio versus the second constant, the product, and an output of the rpm versus MBT table to produce a first sum;

finding a difference between the spark timing input and the first sum;

applying the difference to a table for spark delay versus constant;

multiplying an output of the spark delay table by the output of the EGR versus constant table and the rpm versus nominal exhaust temperature table to produce a second product;

multiplying the second product by an output of the air/fuel ratio versus constant to produce a third product of the exhaust temperature;

providing stored tables and memory for adjusting exhaust temperature as a function of air/fuel ratio, exhaust gas recirculation, spark delay and engine speed;

coupling an input indicating air/fuel ratio to information stored as a function of air/fuel ratio;

coupling an input indicating from EGR rate to information stored as a function of EGR;

coupling an input indicating air charge to information stored as a function of air charge and engine speed;

coupling engine speed to information stored as a function of engine speed;

multiplying the output of information stored as a function of air charge and an input indicating exhaust gas recirculation and applying the output to a first adder;

applying the output of information stored as a function of air/fuel ratio and information stored as a function of engine speed to the first adder;

applying an input indicating spark timing to the negative input of a difference module and applying output of the first adder to the positive input of the difference module;

applying the output of the difference module to an exhaust temperature adjustment table stored as a function of spark retard;

applying the output of the exhaust temperature adjustment table to a second multiplier along with information stored as a function of exhaust gas recirculation, engine speed stored as a function of spark retard to provide an output indicative of exhaust temperature.

11. A method of operating an internal combustion engine wherein the method of operating the engine includes:

using a predicted exhaust gas temperature in conjunction with determining an exhaust gas recirculation mass flow rate; determining exhaust gas recirculation mass flow rate (EM) using:

$$EM = EGR-MASS-STP * SQRT[BP \% PEXH) - 29.92] * SQRT [1460/(EGT-EGRORIF \% 460)]$$

wherein: p2 EGR—MASS—STP—exhaust gas recirculation mass flow at a predetermined or standard temperature and pressure BP—barometric pressure PEXH—exhaust gas pressure SQRT—square root function EGT—exhaust gas temperature EGRORIF—exhaust gas temperature at the metering orifice of the exhaust gas recirculation valve 29.92—barometric pressure 1460 DEG.Rankin—temperature of the exhaust gas at the metering orifice 1000 DEG.Fahrenheit—temperature of exhaust gas at the metering orifice providing inputs indicating air/fuel ratio, exhaust gas recirculation rate, spark timing, air charge intake, engine speed rpm;

providing stored look-up tables indicating air/fuel ratio versus a first constant, air/fuel ratio versus a second constant, exhaust gas recirculation (EGR) versus a third constant, engine aircharge versus a fourth constant, engine rpm and engine aircharge versus MBT, engine rpm and engine discharge versus nominal exhaust temperature;

multiplying an output from the EGR rate sensor and an output of the engine aircharge versus the fourth constant table to produce a first product;

adding the output from the table of air/fuel ratio versus the second constant, the product, and an output of the rpm versus MBT table to produce a first sum;

finding a difference between the spark timing input and the first sum;

applying the difference to a table for spark delay versus constant;

multiplying an output of the spark delay table by the output of the EGR versus constant table and the rpm versus nominal exhaust temperature table to produce a second product;

multiplying the second product by an output of the air/fuel ratio versus constant to produce a third product of the exhaust temperature;

providing stored tables and memory for adjusting exhaust temperature as a function of air/fuel ratio, exhaust gas recirculation, spark delay and engine speed;

coupling an input indicating air/fuel ratio to information stored as a function of air/fuel ratio;

coupling an input indicating from EGR rate to information stored as a function of EGR;

coupling an input indicating air charge to information stored as a function of air charge and engine speed;

coupling engine speed to information stored as a function of engine speed;

multiplying the output of information stored as a function of air charge and an input indicating exhaust gas recirculation and applying the output to a first adder;

applying the output of information stored as a function of air/fuel and information stored as a function of engine speed to the first adder;

applying an input indicating spark timing to the negative input of a difference module and applying output of the first adder to the positive input of the difference module;

applying the output of the difference module to an exhaust temperature adjustment table stored as a function of spark retard;

applying the output of the exhaust temperature adjustment table to a second multiplier along with information stored as a function of exhaust gas recirculation, engine speed stored as a function of spark retard to provide an output indicative of exhaust temperature.

* * * * *